United States Patent
Zhang et al.

(10) Patent No.: US 8,160,172 B2
(45) Date of Patent: Apr. 17, 2012

(54) TRANSMISSION METHODS FOR DOWNLINK ACK/NACK CHANNELS

(75) Inventors: Jianzhong Zhang, Irving, TX (US); Zhouyue Pi, Richardson, TX (US); Farooq Khan, Allen, TX (US); Eddy Kwon, Hwasung-si (KR); Juho Lee, Suwon-si (KR); Jin-Kyu Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 938 days.

(21) Appl. No.: 12/219,438

(22) Filed: Jul. 22, 2008

(65) Prior Publication Data

US 2009/0059884 A1 Mar. 5, 2009

Related U.S. Application Data

(60) Provisional application No. 60/935,300, filed on Aug. 3, 2007.

(51) Int. Cl.
*H04B 7/02* (2006.01)

(52) U.S. Cl. .................................................. 375/267

(58) Field of Classification Search .................. 375/267
See application file for complete search history.

(56) References Cited

U.S. PATENT DOCUMENTS

| 2005/0008092 A1* | 1/2005 | Kadous .................. 375/267 |
| 2007/0011550 A1* | 1/2007 | Agrawal et al. ............. 714/746 |
| 2008/0285670 A1* | 11/2008 | Walton et al. ............. 375/260 |

OTHER PUBLICATIONS

3GPP TSG RAN WG1 #49bis, "*Chairman's notes*", Orlando, USA, Jun. 25-29, 2007.
3GPP TSG RAN WG1 Meeting #49bis, R1-073099, "*Downlink ACK/NACK Transmit Diversity*", Orlando, USA, Jun. 25-29, 2007.
3GPP RAN WG1 Meeting #48bis, R1-071805, "*Performance of DL ACK/NACK Transmission*", St. Julian's, Malta, Mar. 26-30, 2007.

* cited by examiner

*Primary Examiner* — Don N Vo

(57) ABSTRACT

A method from transmitting data via multiple antennas. In this method, four information bits to be transmitted are multiplexed by using either one of a code division multiplexing scheme or a second code division multiplexing scheme combined with a real and imaginary multiplexing scheme, to generate a code division multiplexed symbol including four vectors. Then, the code division multiplexed symbol is repeatedly transmitted by alternatively applying two transmit diversity schemes via four transmission antennas.

44 Claims, 11 Drawing Sheets

FIG. 6

|      | t1    | t2      |
|------|-------|---------|
| ANT 1 | $S_1$ | $-S_2^*$ |
| ANT 2 | $S_2$ | $S_1^*$  |

FIG. 7

|      | f1    | f2      |
|------|-------|---------|
| ANT 1 | $S_1$ | $-S_2^*$ |
| ANT 2 | $S_2$ | $S_1^*$  |

TRANSMISSION METHODS FOR DOWNLINK ACK/NACK CHANNELS

CLAIM OF PRIORITY

This application makes reference to, claims all benefits accruing under 35 U.S.C. §119 from, and incorporates herein, a U.S. Provisional Application entitled TRANSMISSION METHODS FOR DOWNLINK ACK/NACK CHANNELS filed in the U.S. Patent & Trademark Office on 3 Aug. 2007 and there duly assigned Ser. No. 60/935,300.

BACKGROUND OF THE INVENTION

1. Field of the Invention

The present invention relates to methods and apparatus for efficiently transmitting downlink acknowledgement channel messages.

2. Description of the Related Art

A typical cellular radio system includes a number of fixed base stations and a number of mobile stations (user equipment). Each base station covers a geographical area, which is defined as a cell.

During an uplink transmission in the Third ($3^{rd}$) Generation Partnership Project Long Term Evolution (3GPP LTE) systems, a unit of user equipment (UE) transmits a data packet to a base station (BS) after receiving an uplink scheduling grant (i.e., uplink grant) from the BS. In response to the received data packet from the UE, the BS transmits a downlink acknowledgement message (i.e., downlink ACK) to the UE. During a downlink transmission, a BS transmits a data packet to a UE after transmitting a downlink scheduling grant (i.e., downlink grant) to the UE. In response to the received data packet from the BS, the UE transmits an uplink acknowledgement message (i.e., uplink ACK) to the UE.

In the case of four transmission antennas (4Tx), the Space-Frequency Block Code combined with Frequency Switched Transmit Diversity (SFBC+FSTD) transmission matrix is adopted in LTE standard according to "Chairman's notes", of Orlando 3GPP LTE RAN1 49bis meeting held in June 2007.

In addition, Code division multiplex (CDM) based Acknowledgement and Negative Acknowledgement (ACK/NACK) multiplexing and its transmit diversity scheme for two transmission antennas (2Tx) case has been proposed in "Performance of DL ACK/NACK transmission", 3GPP R1-071805, published by Samsung in March 2007, and "Downlink ACK/NACK Transmit diversity", 3GPP R1-073099, published by Samsung in June 2007, to multiplex the information bits of acknowledgement channel signals.

CDM ACK/NACK approach, however, does not immediately work with the 4Tx SFBC+FSTD transmit diversity scheme, because the CDM orthogonality is lost after the 4x SFBC+FSTD operation.

SUMMARY OF THE INVENTION

It is therefore an object of the present invention to provide an improved method and transmitter circuit for transmitting data via multiple antennas.

It is another object of the present invention to provide transmit diversity schemes via four transmission antennas that are compatible with the CDM ACK/NACK multiplexing structure.

According to one aspect of the present invention, a method for transmitting data is provided. In this method, four information bits to be transmitted are multiplexed by using one of a first code division multiplexing scheme and a second code division multiplexing scheme combined with a real and imaginary multiplexing scheme, to generate a code division multiplexed symbol a including four vectors $a=[a_1, \ldots, a_4]$. Then, the code division multiplexed symbol a is repeatedly transmitted by alternatively applying two transmit diversity schemes via four transmission antennas.

In a first transmit diversity scheme, a transmit signal may be established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} a_1 & a_2 & a_3 & a_4 \\ 0 & 0 & 0 & 0 \\ -a_2^* & a_1^* & -a_4^* & a_3^* \\ 0 & 0 & 0 & 0 \end{bmatrix},$$

where $T_{ij}$ represents the symbol transmitted on the i-th antenna and the j-th subcarrier, and i=1, 2, 3, 4, j=1, 2, 3, 4. In a second transmit diversity scheme, a transmit signal may be established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} 0 & 0 & 0 & 0 \\ a_1 & a_2 & a_3 & a_4 \\ 0 & 0 & 0 & 0 \\ -a_2^* & a_1^* & -a_4^* & a_3^* \end{bmatrix}$$

where $T_{ij}$ represents the symbol transmitted on the i-th antenna and the j-th subcarrier, and i=1, 2, 3, 4, j=1, 2, 3, 4.

Alternatively, in a first transmit diversity scheme, a transmit signal may be established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} a_1 & a_2 & 0 & 0 \\ 0 & 0 & a_3 & a_4 \\ -a_2^* & a_1^* & 0 & 0 \\ 0 & 0 & -a_4^* & a_3^* \end{bmatrix},$$

where $T_{ij}$ represents the symbol transmitted on the i-th antenna and the j-th subcarrier, and i=1, 2, 3, 4, j=1, 2, 3, 4. In a second transmit diversity scheme, a transmit signal may be established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} 0 & 0 & a_3 & a_4 \\ a_1 & a_2 & 0 & 0 \\ 0 & 0 & -a_4^* & a_3^* \\ -a_2^* & a_1^* & 0 & 0 \end{bmatrix}$$

where $T_{ij}$ represents the symbol transmitted on the i-th antenna and the j-th subcarrier, and i=1, 2, 3, 4, j=1, 2, 3, 4.

In accordance with the first code division multiplexing scheme, the code division multiplexed symbol a may be established by:

$$a = SWb = [s_1, \ldots, s_4] \begin{bmatrix} w_1 b_1 \\ \vdots \\ w_4 b_4 \end{bmatrix}$$

where $b=[b_1, \ldots, b_4]$ indicates the four information bits, $S=[s_1, \ldots, s_4]$ indicates a unitary spreading matrix where each spreading vector $s_1, \ldots, s_4$ is of size 1×4, $W=\text{diag}[w_1, \ldots w_4]$ is a diagonal matrix indicating transmission amplitudes of the information bits.

In accordance with the second code division multiplexing scheme combined with the real and imaginary multiplexing scheme, the code division multiplexed symbol a may be established by:

$$a = S(W_i b_i + jW_q b_q) = [s_1, \ldots, s_4] \begin{bmatrix} w_{1,i}b_{1,i} + jw_{1,q}b_{1,q} \\ \vdots \\ w_{4,i}b_{4,i} + jw_{4,q}b_{4,q} \end{bmatrix}$$

where $b_i[b_{1,i}, \ldots, b_{4,i}]$ indicates the four information bits to be carried on a real branch, $b_q=[b_{1,q}, \ldots, b_{4,q}]$ indicates the four information bits to be carried on an imaginary branch, $S=[s_1, \ldots, s_4]$ indicates a unitary spreading matrix where each spreading vector $s_1, \ldots, s_4$ is of size 1×4, and $W_i=\text{diag}[w_{1,i}, \ldots, w_{4,i}]$ and $W_q=\text{diag}[w_{1,q}, \ldots, w_{4,q}]$ are two diagonal matrices indicating transmission amplitudes of the information bits on the real and imaginary branches, respectively.

The first transmit diversity scheme may be applied on even-numbered repetitions; while the second transmit diversity scheme may be applied on odd-numbered repetitions.

Alternatively, the first transmit diversity scheme may be applied on odd-numbered repetitions; while the second transmit diversity scheme may be applied on even-numbered repetitions.

When the number of repetitions is even, transmitting even number of repetitions by the two transmit diversity schemes may be alternatively applied in at least one time unit among a plurality of time units within a subframe. In this case, all of the repetitions may be assigned in a time unit selected from the plurality of time units within a subframe. Alternatively, a first subset of the repetitions may be assigned in a first time unit, and a second subset of the repetitions may be assigned in a second time unit, with each of the first subset and the second subset including even number of repetitions.

According to another aspect of the present invention, a method for transmitting data is provided. In this method, three information bits to be transmitted are multiplexed by using one of a first code division multiplexing scheme and a second code division multiplexing scheme combined with a real and imaginary multiplexing scheme, to generate a code division multiplexed symbol a including three vectors $a=[a_1, \ldots, a_3]$. The code division multiplexed symbol a is then repeatedly transmitted by applying a transmit diversity scheme via four transmission antennas.

The transmit signal may be established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} a_1 & 0 & a_2 & -a_3 \\ 0 & a_1 & a_3^* & a_2^* \\ -a_2^* & -a_3 & a_1^* & 0 \\ a_3^* & -a_2 & 0 & a_1^* \end{bmatrix},$$

where $T_{ij}$ represents the symbol transmitted on the i-th antenna and the j-th subcarrier, and i=1, 2, 3, 4, j=1, 2, 3, 4.

In accordance with the first code division multiplexing scheme, the code division multiplexed symbol a may be established by:

$$a = SWb = [s_1, \ldots, s_3] \begin{bmatrix} w_1 b_1 \\ \vdots \\ w_3 b_3 \end{bmatrix}$$

where $b=[b_1, \ldots, b_3]$ indicates the four information bits, $S=[s_1, \ldots, s_3]$ indicates a unitary spreading matrix where each spreading vector $s_1, \ldots, s_3$ is of size 1×3, $W=\text{diag}[w_1, \ldots, w_3]$ is a diagonal matrix indicating transmission amplitudes of the information bits.

In accordance with the second code division multiplexing scheme combined with the real and imaginary multiplexing scheme, the code division multiplexed symbol a being established by:

$$a = S(W_i b_i + jW_q b_q) = [s_1, \ldots, s_3] \begin{bmatrix} w_{1,i}b_{1,i} + jw_{1,q}b_{1,q} \\ \vdots \\ w_{3,i}b_{3,i} + jw_{3,q}b_{3,q} \end{bmatrix}$$

where $b_i=[b_{1,i}, \ldots, b_{3,i}]$ indicates the four information bits to be carried on a real branch, $b_q=[b_{1,q}, \ldots, b_{3,q}]$ indicates the four information bits to be carried on an imaginary branch, $S=[s_1, \ldots, s_3]$ indicates a unitary spreading matrix where each spreading vector $s_1, \ldots, s_3$ is of size 1×3, and $W_i=\text{diag}[w_{1,i}, \ldots, w_{3,i}]$ and $W_q=\text{diag}[w_{1,q}, \ldots, w_{3,q}]$ are two diagonal matrices indicating transmission amplitudes of the information bits on the real and imaginary branches, respectively.

The code division multiplexed symbol a may be transmitted for three repetitions by using a resource mapping scheme selected from a first resource mapping scheme and a second resource mapping scheme. When the first resource mapping scheme is selected, the three repetitions are transmitted in a time unit among a plurality of time units within a subframe; when the second resource mapping scheme is selected, the three repetitions are transmitted in three time units among the plurality of time units within the subframe, with each repetition corresponding to one time unit.

Alternatively, the code division multiplexed symbol a may be repeatedly transmitted for a plurality of times by using a resource mapping scheme selected from a first resource mapping scheme and a second resource mapping scheme. When the first resource mapping scheme is selected, the plurality of repetitions are transmitted in a time unit among a plurality of time units within a subframe; when the second resource mapping scheme is selected, the plurality of repetitions are transmitted in three time units among the plurality of time units within the subframe by assigning roughly equal number of repetitions to each one of the three time units.

An index, k(n), of the time unit assigned to an n-th repetition may be established by:

$$k(n) = \begin{cases} 0 & \text{if } n \leq \lceil N/3 \rceil \\ 1 & \text{if } n \leq 2 \cdot \lceil N/3 \rceil, \\ 2 & \text{if } n > 2 \cdot \lceil N/3 \rceil \end{cases}$$

where N is the total number of the repetitions.

Alternatively, the index, k(n), of the time unit assigned to an n-th repetition being established by:

$k(n)=\text{mod}(N-1, 3)$ where N is the total number of the repetitions.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 6 schematically illustrates a Space Time Block Code (STBC) transmission diversity scheme for two transmission antennas;

FIG. 7 schematically illustrates a Space Frequency Block Code (SFBC) transmission diversity scheme for two transmission antennas;

DETAILED DESCRIPTION OF THE INVENTION

The present invention will be described more fully hereinafter with reference to the accompanying drawings, in which preferred embodiments of the invention are shown. As those skilled in the art would realize, the described embodiments may be modified in various different ways, all without departing from the spirit or scope of the present invention.

Figure 1:
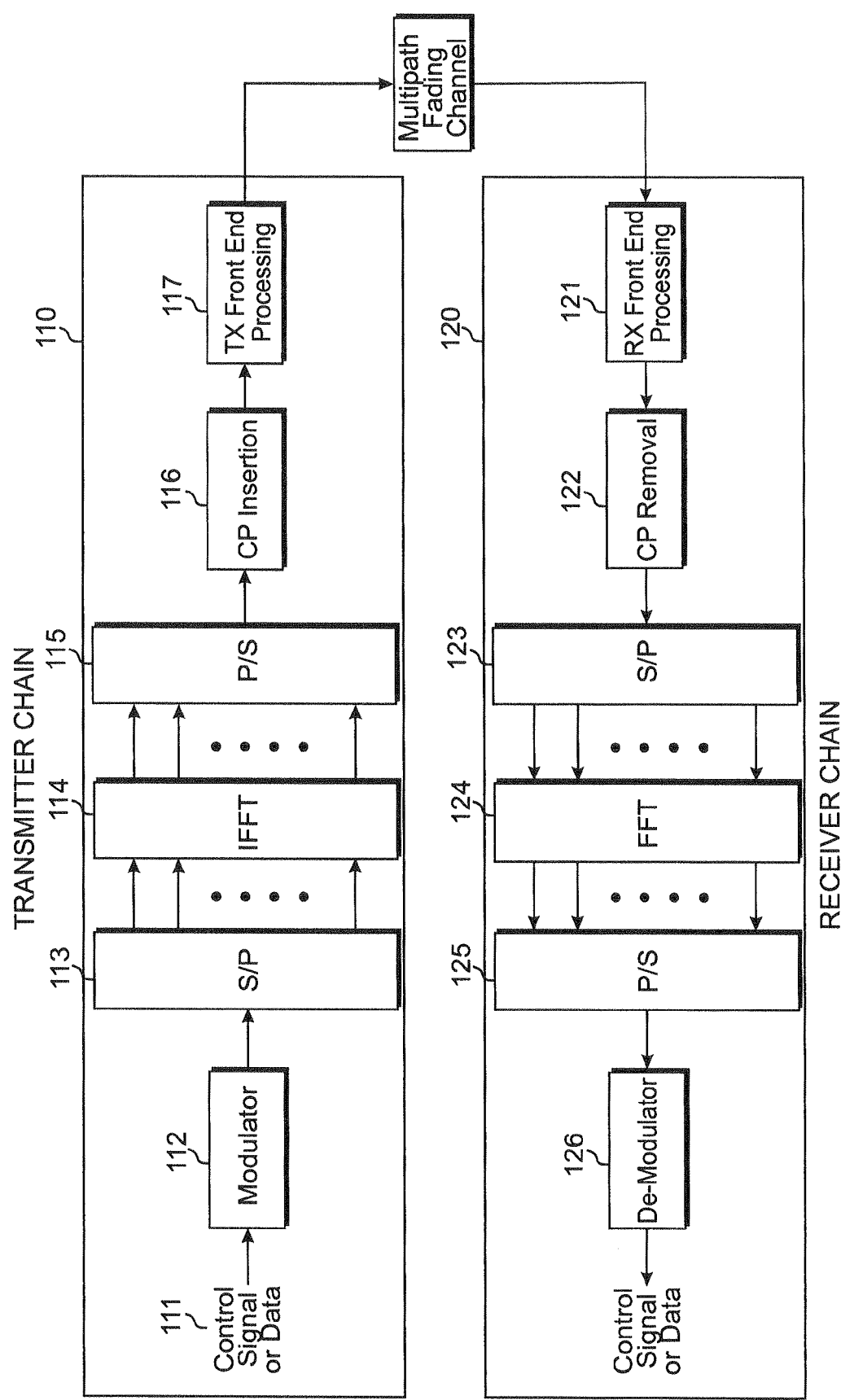
FIG. 1 schematically illustrates an Orthogonal Frequency Division Multiplexing (OFDM) transceiver chain suitable for the practice of the principles of the present inventions.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 2:
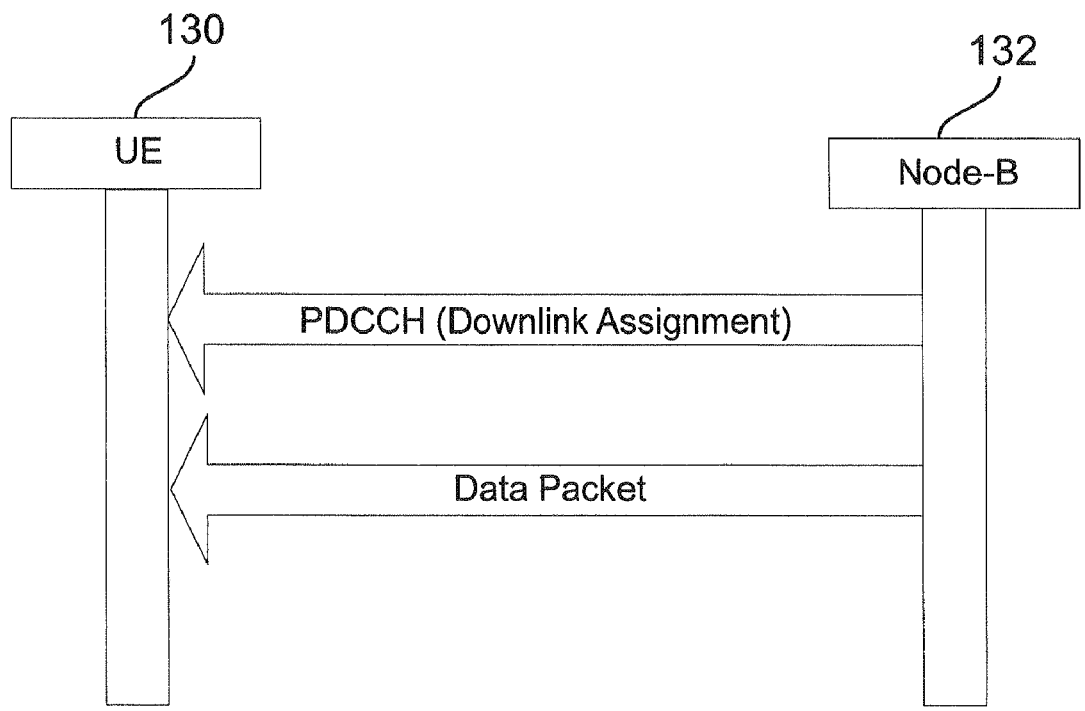
FIG. 2 schematically illustrates downlink assignment control signaling in a 3G LTE system.
Figure 3:
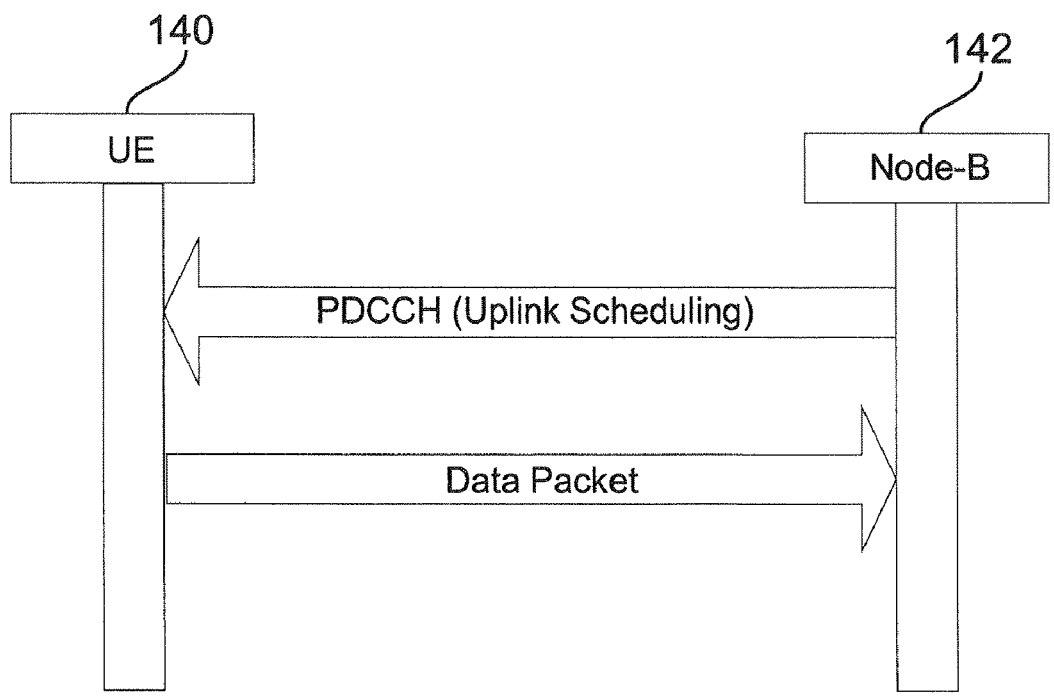
FIG. 3 schematically illustrates uplink assignment control signaling in a 3G LTE system.

In packet-based wireless data communication systems, a control signal accompanies a downlink data transmission as shown in FIG. 2. In the $3^{rd}$ Generation Partnership Project Long Term Evolution (3GPP LTE) system, this control channel is referred to as Physical Downlink Control Channel (PDCCH). As shown in FIG. 2, a Node-B (i.e., base station) 132 transmits a data packet and downlink assignment via the PDCCH to a unit of user equipment (UE) 132. The PDCCH carries information such as UE Identity (ID), resource assignment information, payload size, modulation, Hybrid automatic repeat-request (HARQ) information, and multiple-input and multiple-output (MIMO) related information. The PDCCH is used for both downlink assignments and uplink scheduling grants as shown in FIG. 2 and FIG. 3 respectively. As shown in FIG. 3, Node-B 142 transmits uplink scheduling via the PDCCH to UE 140. In response to the uplink scheduling received, UE 140 transmits a data packet to Node-B 142.

Figure 4:
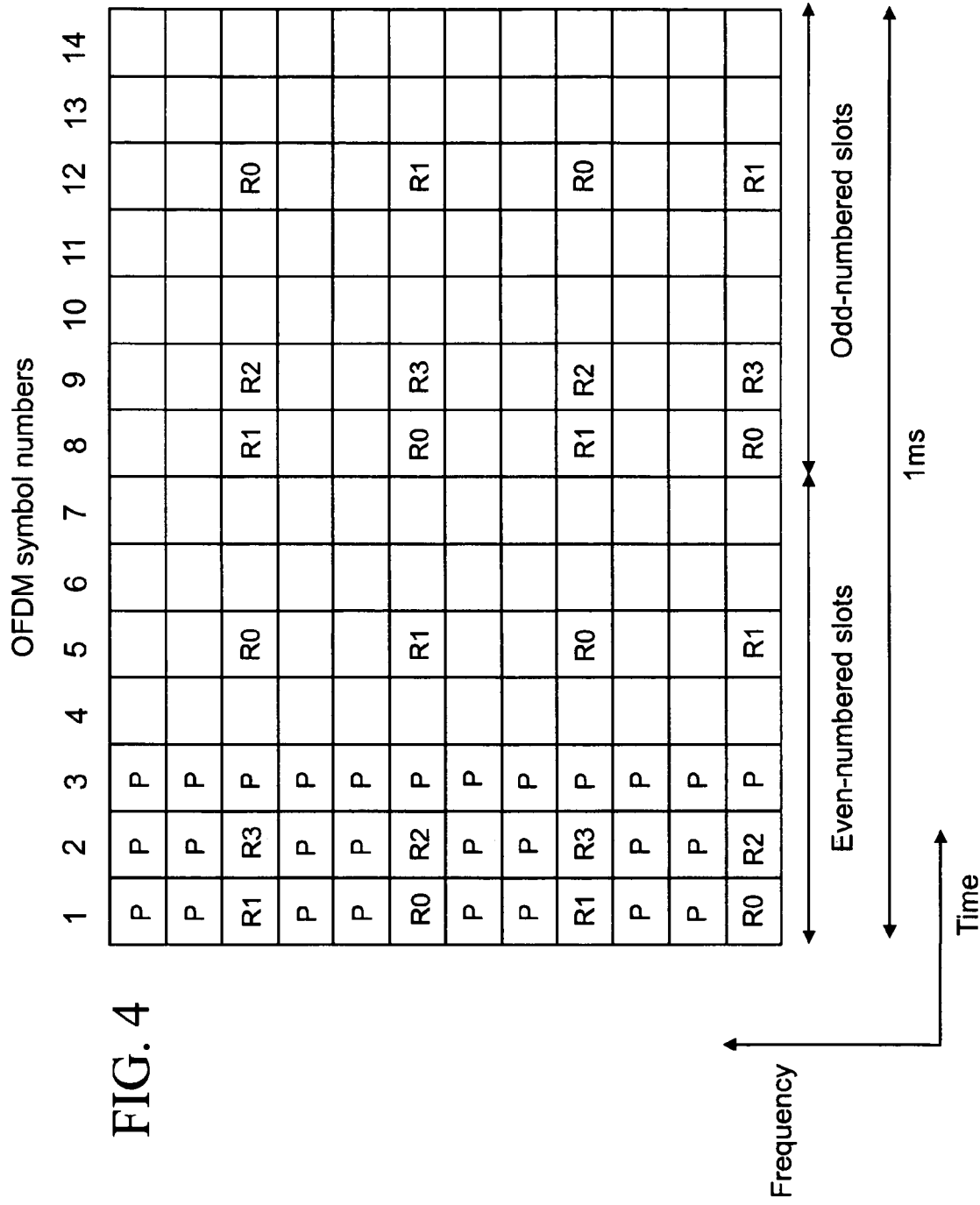
FIG. 4 schematically illustrates a mapping scheme of Physical Downlink Control Channel (PDCCH) and reference signals within a subframe.

In the 3GPP LTE system, some resources, namely control channel elements (CCEs), are reserved for downlink control channel transmission. The CCEs are mapped to subcarriers within the first three OFDM symbols within a subframe as shown in FIG. 4. The number of OFDM symbols allocated for PDCCH transmission can be 1, 2 or 3. Dynamic Category 0 (Cat0) bits is a LTE terminology used in 3GPP LTE standard body. The dynamic Cat0 bits has a maximum size of 2 bits indicating, for example, allocation of 0, 1, 2 or 3 OFDM symbols for PDCCH transmission. In another set-up, Cat0 information can also indicate the number of control channel elements (CCEs) allocated for PDCCH transmission. The Cat0 information is transmitted every subframe where a control channel element (CCE) is present. The OFDM symbols that are not used for control channel transmission are used for data transmission. The benefit of Cat0 information is that subcarrier resources within the first three OFDM symbols that are temporarily not used for control information transmission can be used for data transmission thus improving system capacity and throughput. Note Cat0 is also called Control Channel Format Indicator (CCFI).

Figure 5:
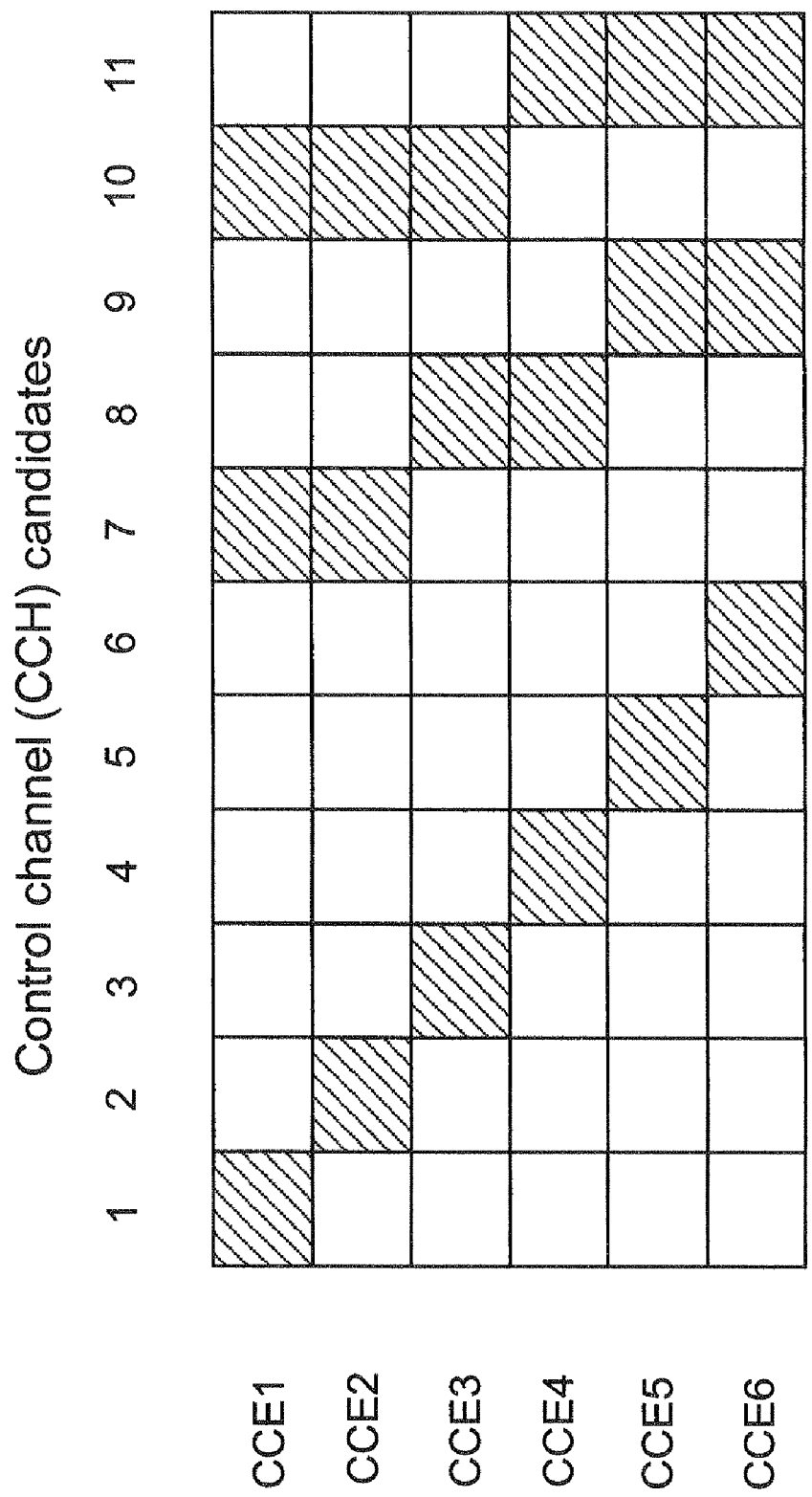
FIG. 5 schematically illustrates a mapping scheme of LTE downlink control channel elements and control channel candidate sets.

Control channel candidate set can be constructed based on the control channel elements reserved for PDCCH. Each downlink assignment or uplink scheduling grant can be transmitted on one of the control channel candidate set. An example of control channel elements and control channel candidate set is shown in FIG. 5. In this example, eleven control channel candidate sets can be constructed based on six control channel elements CCE 1, CCE2, . . . , CCE 6. Note that a tree structure can also be used for the construction of control channel candidates from control channel elements. Each control channel element can be viewed as a leaf node of the tree. Each control channel candidate can be either a leaf node or an intermediate non-leaf node in the tree. In the rest of the document, we will refer to these control channel candidate sets as control channel resource sets, or simply, resource sets.

The methods of diversity in general fall into the following categories: space, angle, polarization, field, frequency, time and multipath diversity. Space diversity can be achieved by using multiple transmit or receive antennas. The spatial separation between the multiple antennas is chosen so that the diversity branches experience fading with little or no correlation. Transmit diversity uses multiple transmission antennas to provide the receiver with multiple uncorrelated replicas of the same signal. Transmit diversity schemes can further be divided into open loop transmit diversity and closed-loop transmit diversity schemes. In the open loop transmit diversity scheme, no feedback is required from the receiver. In one known arrangement of closed loop transmit diversity scheme, the receiver computes the phase and amplitude adjustment that should be applied at the transmitter antennas to maximize the received signal power at the receiver. In another arrangement of closed loop transmit diversity referred to as selection transmit diversity (STD), the receiver provides feedback information to the transmitter on antenna(s) to be used for transmission.

An example of open-loop transmission diversity scheme is the Alamouti 2x1 space-time block code (STBC) transmission diversity scheme as illustrated in FIG. 6. In this approach, during any symbol period, i.e., time period, a transmitter transmits two data symbols via two transmission antennas to a receiver. As shown in FIG. 6, during the first symbol interval t1, symbols $S_1$ and $S_2$ are respectively transmitted via antennas ANT 1 and ANT 2. During the next symbol period t2, symbols $-S^*_2$ and $S^*_1$ are respectively transmitted via antennas ANT 1 and ANT 2, where x* represents complex conjugate of x. After receiving the signals, the receiver performs a plurality of processes to recover original symbols $S_1$ and $S_2$. Note that the instantaneous channel gains g1 and g2 for ANT 1 and ANT 2, respectively, are required for processing at the receiver. Therefore, the transmitter needs to transmit separate pilot symbols via both the antennas ANT 1 and ANT 2 for channel gain estimation at the receiver. The diversity gain achieved by Alamouti coding is the same as that achieved in Maximum Ratio Combining (MRC).

The 2x1 Alamouti scheme can also be implemented in a space-frequency block code (SFBC) transmission diversity scheme as illustrated in FIG. 7. As shown in FIG. 7, symbols $S_1$ and $S_2$ are respectively transmitted to a receiver via antennas ANT 1 and ANT 2 on a first subcarrier having frequency f1 in an Orthogonal Frequency Division Multiplexing (OFDM) system, symbols $-S^*_2$ and $S^*_1$ are respectively transmitted via antennas ANT 1 and ANT 2 on a second subcarrier having frequency f2.

The received signal at the receiver on subcarrier having frequency f1 is $r_1$, and the received signal at the receiver on subcarrier having frequency f2 is $r_2$. $r_1$ and $r_2$ can be written as:

$$r_1 = h_1 s_1 + h_2 s_2 + n_1$$

$$r_2 = -h_1 s_2^* + h_2 s_1^* + n_2, \quad (1)$$

where $h_1$ and $h_2$ are channel gains from ANT 1 and ANT 2 respectively. We also assume that the channel from a given antennas does not change between subcarrier having frequency $f_1$ and subcarrier having frequency $f_2$. The receiver performs equalization on the received signals and combines the two received signals ($r_1$ and $r_2$) to recover the symbols $S_1$ and $S_2$. The recovered symbols $S_1$ and $S_2$ can be written as:

$$\hat{s}_1 = h_1^* r_1 + h_2 r_2^* \quad (2)$$

$$= h_1^*(h_1 s_1 + h_2 s_2 + n_1) + h_2(-h_1 s_2^* + h_2 s_1^* + n_2)^*$$

$$= (|h_1|^2 + |h_2|^2)s_1 + h_1^* n_1 + h_2 n_2^*$$

$$\hat{s}_2 = h_2^* r_1 + h_1 r_2^*$$

$$= h_2^*(h_1 s_1 + h_2 s_2 + n_1) + h_1(-h_1 s_2^* + h_2 s_1^* + n_2)^*$$

$$= (|h_1|^2 + |h_2|^2)s_2 + h_2^* n_1 + h_1 n_2^*$$

It can be seen that both of the transmitted symbols $S_1$ and $S_2$ achieve full spatial diversity, that is, each of the transmitted symbols $S_1$ and $S_2$ completely removes an interference from the other one.

In the case of four transmission antennas, the following Space-Frequency Block Code combined with Frequency Switched Transmit Diversity (SFBC+FSTD) transmission matrix is adopted in LTE standard according to the chairman's note of Orlando 3GPP RAN1 meeting:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix}, \quad (3)$$

where $T_{ij}$ represents the symbol transmitted on the i-th antenna and the j-th subcarrier, and i=1, 2, 3, 4, j=1, 2, 3, 4 for the case of 4-Tx antennas.

An equivalent representation of the above SFBC+FSTD transmit signal given in equation (1) exists in the following form. Let the transmit signal vector $y(i)=[y^{(0)}(i) \ y^{(1)}(i) \ y^{(2)}(i) \ y^{(3)}(i)]^T$ denote the transmit signal vector on four transmission antennas for the i-th subcarrier. The transmit signal generated from the SFBC+FSTD scheme in (3) can be equivalently written as follows, assuming the transmit signal is mapped to the four consecutive subcarriers 4i, 4i+1, 4i+1, 4i+3:

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} Re(S_1) \\ Re(S_2) \\ Re(S_3) \\ Re(S_4) \\ Im(S_1) \\ Im(S_2) \\ Im(S_3) \\ Im(S_4) \end{bmatrix} \quad (4)$$

where Re (x) and Im(x) denotes the real and imaginary parts of the complex symbol x.

Code division multiplex (CDM) based Acknowledgement and Negative Acknowledgement (ACK/NACK) multiplexing and its transmit diversity scheme for two transmission antennas (2Tx) case was proposed in "Performance of DL ACK/NACK transmission", 3GPP R1-071805, published by Samsung in March 2007, and "Downlink ACK/NACK Transmit diversity", 3GPP R1-073099, published by Samsung in June 2007. For CDM of ACK/NACK channels without real and imaginary (I and Q) multiplexing, let $b=[b_1, \ldots, b_4]$ be the four ACK bits that are Binary phase-shift keying (BPSK) modulated, let $S=[s_1, \ldots, s_4]$ be the unitary spreading matrix where each spreading vector $s_1, \ldots, s_4$ is of size 1×4, then the transmit signal $a=[a_1, \ldots, a_4]$ after CDM spreading is given by:

$$a = SWb = [s_1, \ldots, s_4] \begin{bmatrix} w_1 b_1 \\ \vdots \\ w_4 b_4 \end{bmatrix} \quad (5)$$

where $W=\text{diag}[w_1, \ldots, w_4]$ is a diagonal matrix whose diagonal entries starting in the upper left corner are $w_1, \ldots, w_4$. W indicates the transmission amplitude of the ACK bits.

Furthermore, multiplexing capacity can be doubled if we use both real and imaginary (I and Q) branches to carry different ACK bits with different power settings. To this end, let $b_i=[b_{1,i}, \ldots, b_{4,i}]$ be the four BPSK-modulated ACK bits to be carried on the i-branch (real branch) and let $b_q=[b_{1,q}, \ldots b_{4,q}]$ be the four BPSK-modulated ACK bits to be carried on the q-branch (imaginary branch), let $S=[s_1, \ldots, s_4]$ be the unitary spreading matrix where each spreading vector $s_1, \ldots, s_4$ is of size 1×4, then the transmit signal $a=[a_1, \ldots, a_4]$ after CDM spreading is given by:

$$a = S(W_i b_i + j W_q b_q) = [s_1, \ldots, s_4] \begin{bmatrix} w_{1,i} b_{1,i} + j w_{1,q} b_{1,q} \\ \vdots \\ w_{4,i} b_{4,i} + j w_{4,q} b_{4,q} \end{bmatrix} \quad (6)$$

where $W_i=\text{diag}[w_{1,i}, \ldots, w_{4,i}]$ and $W_q=\text{diag}[w_{1,q}, \ldots, w_{4,q}]$ are two diagonal matrices indicating the transmission amplitudes of the ACK bits on I and Q branches, respectively.

Figure 8:
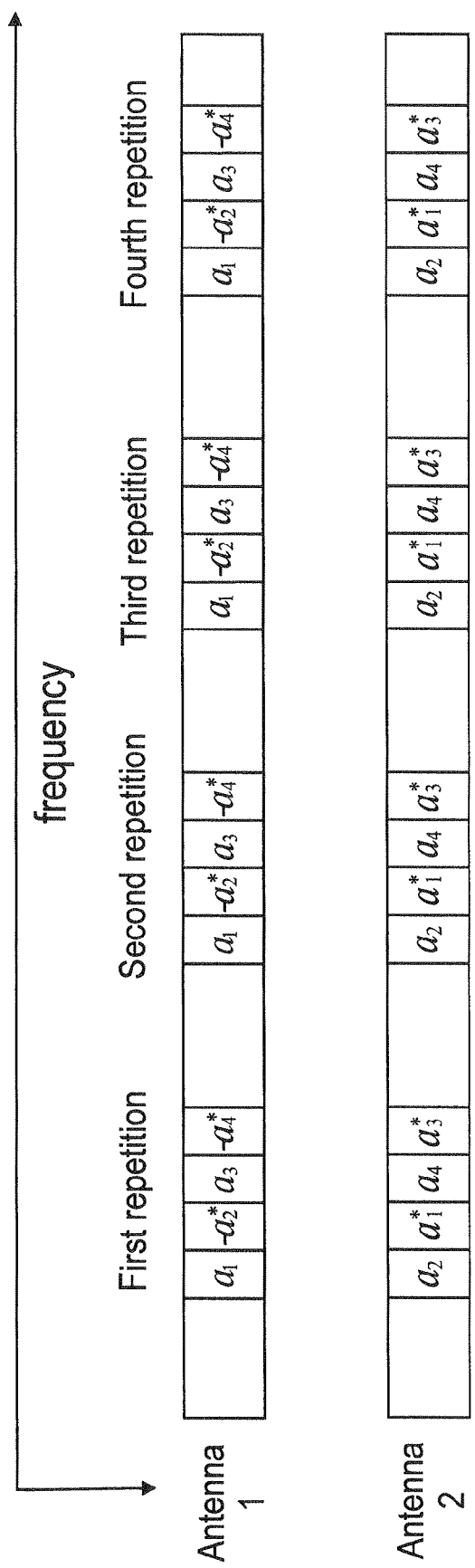
FIG. 8 schematically illustrates a Code Division Multiplex (CDM) combined with Space Frequency Block Code (SFBC) and repetition scheme.

The example of 2 Tx SFBC transmit diversity with CDMed ACK/NACK channels are shown below. Take an example of transmit diversity scheme for the 2 Tx case with a spreading factor of four (SF4) CDM, assuming the number of OFDM control symbol is N=1, and the number of repetition is R=4. In each transmission, the four symbols $a=[a_1, \ldots, a_4]$ are mapped to the 4×1 resource unit (RU) using SFBC across both transmission antennas. Note that one resource unit covers four neighboring subcarriers and one OFDM symbol in the time-frequency resource mapping. The scheme is illustrated in FIG. 8.

In this invention, the CDM ACK/NACK approach does not immediately work with the 4Tx SFBC+FSTD transmit diversity scheme, since the CDM orthogonality is lost after the 4× SFBC+FSTD operation. Therefore, we propose several 4Tx transmit diversity schemes that are compatible with the ACK/NACK CDM multiplexing structure.

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the figures of the accompanying drawings.

In a first embodiment according to the principles of the present invention, we propose to use the following two alternating transmit diversity schemes on the repetitions of the CDMed symbol vector $a=[a_1, \ldots, a_4]$, which is the defined as $$a = SWb = [s_1, \ldots, s_4] \begin{bmatrix} w_1 b_1 \\ \vdots \\ w_4 b_4 \end{bmatrix}$$

for the CDM only case, and defined as $$a = S(W_i b_i + j W_q b_q) = [s_1, \ldots, s_4] \begin{bmatrix} w_{1,i} b_{1,i} + j w_{1,q} b_{1,q} \\ \vdots \\ w_{4,i} b_{4,i} + j w_{4,q} b_{4,q} \end{bmatrix}$$

in the CDM+I/Q multiplexing case. The two proposed transmit diversity scheme are given by the following transmission matrices A and B:

$$A = \begin{bmatrix} a_1 & a_2 & a_3 & a_4 \\ 0 & 0 & 0 & 0 \\ -a_2^* & a_1^* & -a_4^* & a_3^* \\ 0 & 0 & 0 & 0 \end{bmatrix}, B = \begin{bmatrix} 0 & 0 & 0 & 0 \\ a_1 & a_2 & a_3 & a_4 \\ 0 & 0 & 0 & 0 \\ -a_2^* & a_1^* & -a_4^* & a_3^* \end{bmatrix} \quad (7)$$

Equivalently, the transmission matrices A and B can be respectively represented by:

$$A: \begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \\ 0 & 0 & 0 & 0 & 0 & 0 & 0 & 0 \end{bmatrix} \begin{bmatrix} \text{Re}(a_1) \\ \text{Re}(a_2) \\ \text{Re}(a_3) \\ \text{Re}(a_4) \\ \text{Im}(a_1) \\ \text{Im}(a_2) \\ \text{Im}(a_3) \\ \text{Im}(a_4) \end{bmatrix} \quad (8)$$

-continued $$B: \begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 0 & 0 & 0 & 0 & 0 & 0 & 0 & 0 \\ 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \text{Re}(a_1) \\ \text{Re}(a_2) \\ \text{Re}(a_3) \\ \text{Re}(a_4) \\ \text{Im}(a_1) \\ \text{Im}(a_2) \\ \text{Im}(a_3) \\ \text{Im}(a_4) \end{bmatrix},$$

If there are N repetitions of the CDM vector $a=[a_1, \ldots, a_4]$, then we assign the transmission matrix A to odd repetitions, and the transmission matrix B to even repetitions. For example, if we have 4 repetitions of $a=[a_1, \ldots, a_4]$, we can assign it in an ABAB fashion, in which Matrix A is assigned to Repetition 1, Matrix B is assigned to Repetition 2, Matrix A is assigned to Repetition 3, and Matrix B is assigned to Repetition 4. For the matrices shown in Equation (8), i=2m for Matrix A, and i=2m+1 for Matrix B, where m is an integer and m>0. Alternatively, we can assign the transmission matrix B to odd repetitions, and A to even repetitions, e.g., a BABA fashion. For the matrices shown in Equation (8), i=2m+1 for Matrix A, and i=2m for Matrix B, where m is an integer and m>0.

In a second embodiment according to the principles of the present invention, if the number of repetitions of the CDMed vector $a=[a_1, \ldots, a_4]$ is even, then we propose to always map same number of repetitions in the OFDM symbols that carries these repetitions, in order to keep the power amplifier (PA) balanced for all transmission antennas. In addition, the alternating transmit diversity schemes A and B are applied in each one OFDM symbol. In the example of four repetitions, we propose four ways of mapping the repetitions to the physical resource elements (Res) within the first three OFDM symbols:

1. map all 4 repetitions to OFDM symbol #0
2. map 2 repetitions each to OFDM symbols #0 and #1;
3. map 2 repetitions each to OFDM symbols #1 and #2; and
4. map 2 repetitions each to OFDM symbols #0 and #2.

Figure 9:
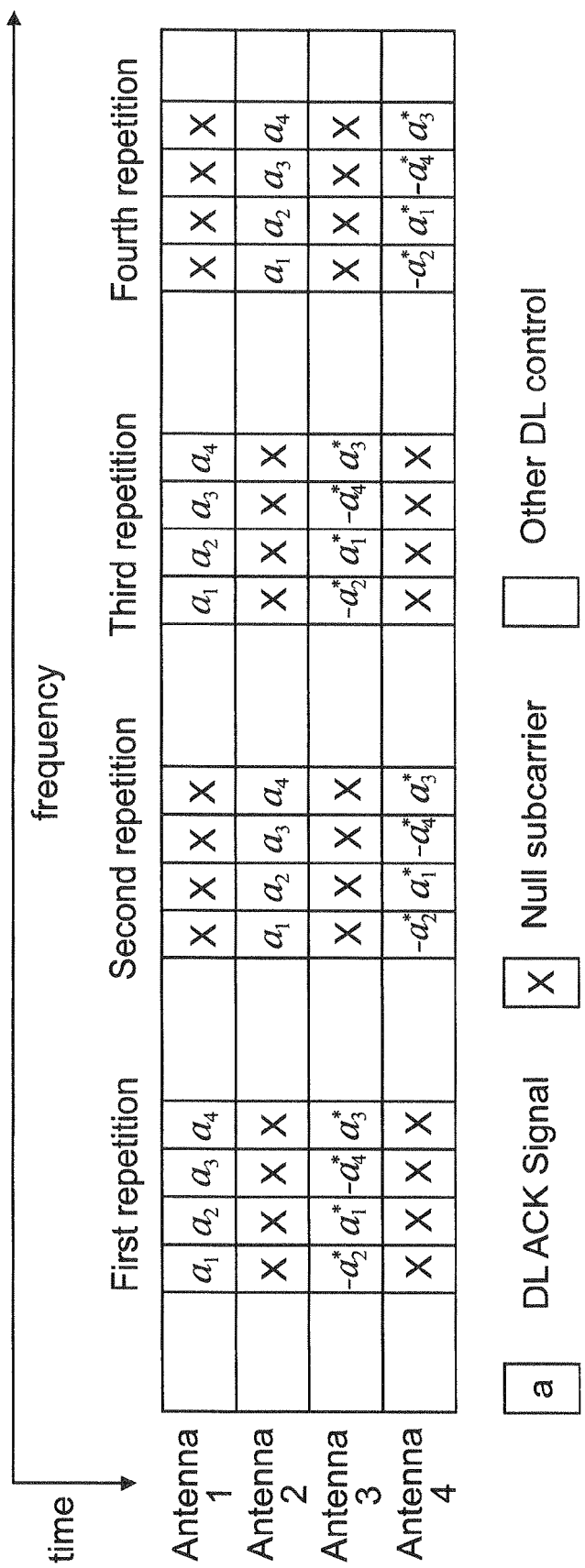
FIG. 9 schematically illustrates a Code Division multiplex (CDM) combined with Space Frequency Block Code (SFBC) scheme for four transmission antennas according to one embodiment of the principles of the present invention.
Figure 10:
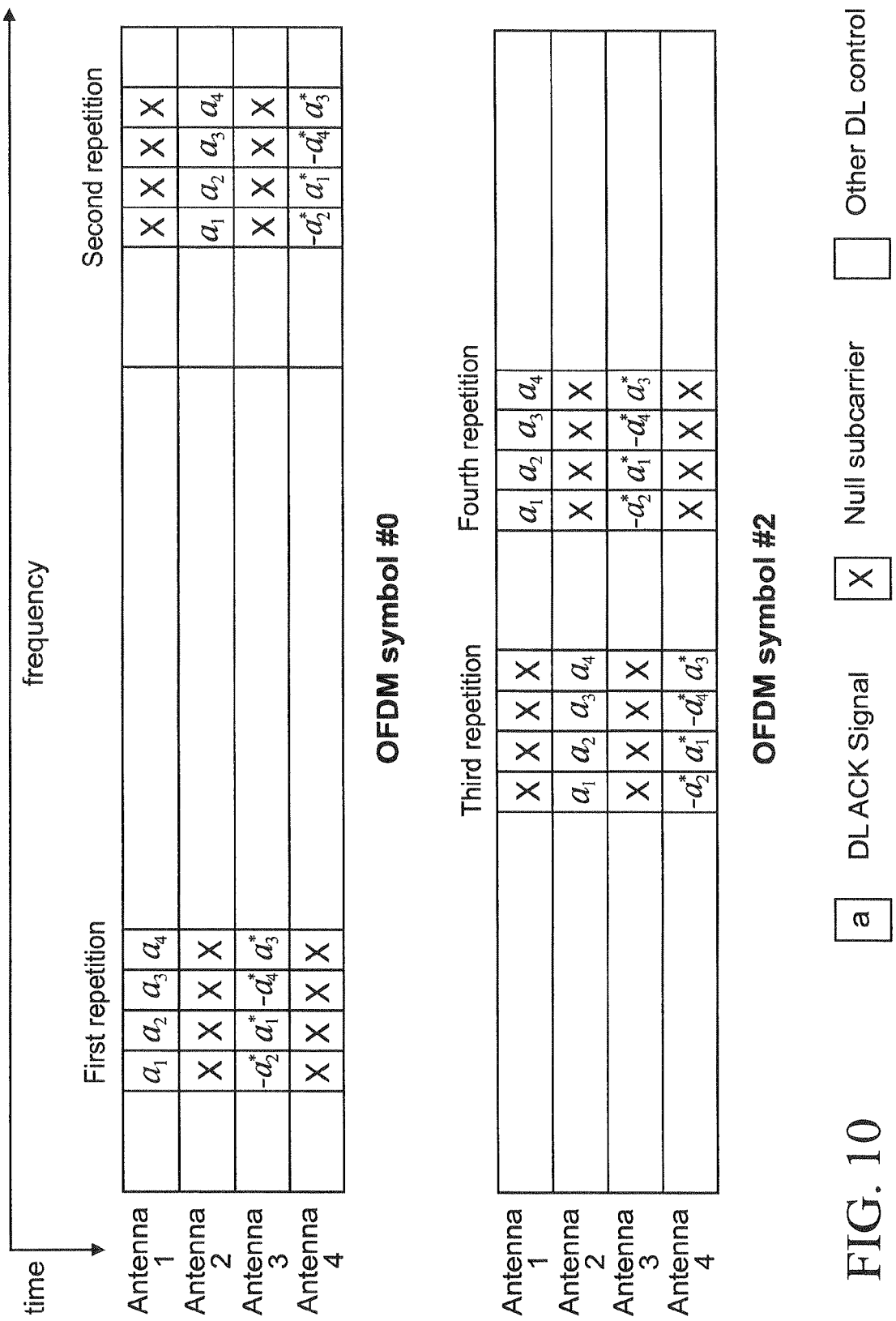
FIG. 10 schematically illustrates a Code Division multiplex (CDM) combined with Space Frequency Block Code (SFBC) scheme for four transmission antennas according to another embodiment of the principles of the present invention.

In FIG. 9, the 4Tx transmit diversity of CDMed ACK/NACK vector with SF4 is illustrated for the case where all four repetitions are mapped onto the first OFDM symbol #0. In FIG. 10, the 4Tx transmit diversity of CDMed ACK/NACK vector with SF4 is illustrated for the case where the first two repetitions are mapped onto the OFDM symbol #0, and the other two repetitions are mapped onto the OFDM symbol #2.

Figure 11:
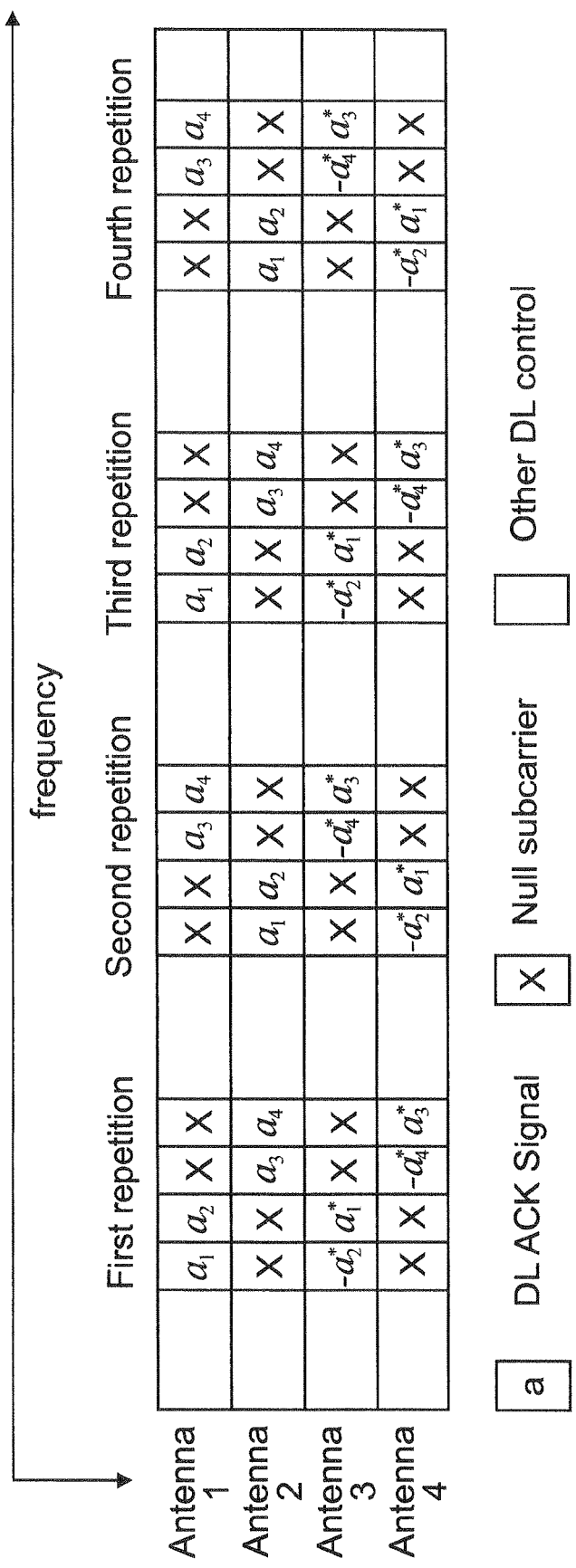
FIG. 11 schematically illustrates a Code Division multiplex (CDM) scheme combined with a Space Frequency Block Code combined with Frequency Switched Transmit Diversity (SFBC+FSTD) scheme for four transmission antennas according to another embodiment of the principles of the present invention.

In a third embodiment according to the principles of the present invention shown in FIG. 11, SFBC-FSTD mapping changes on repetitions. The two transmission matrices A and B in the two SFBC-FSTD schemes can be respectively represented by:

$$A = \begin{bmatrix} a_1 & a_2 & 0 & 0 \\ 0 & 0 & a_3 & a_4 \\ -a_2^* & a_1^* & 0 & 0 \\ 0 & 0 & -a_4^* & a_3^* \end{bmatrix}, B = \begin{bmatrix} 0 & 0 & a_3 & a_4 \\ a_1 & a_2 & 0 & 0 \\ 0 & 0 & -a_4^* & a_3^* \\ -a_2^* & a_1^* & 0 & 0 \end{bmatrix} \quad (9)$$

This scheme allows capturing full space and frequency diversity at the expense of some loss of orthogonality of the CDM ACK/NACKs.

Figure 12:
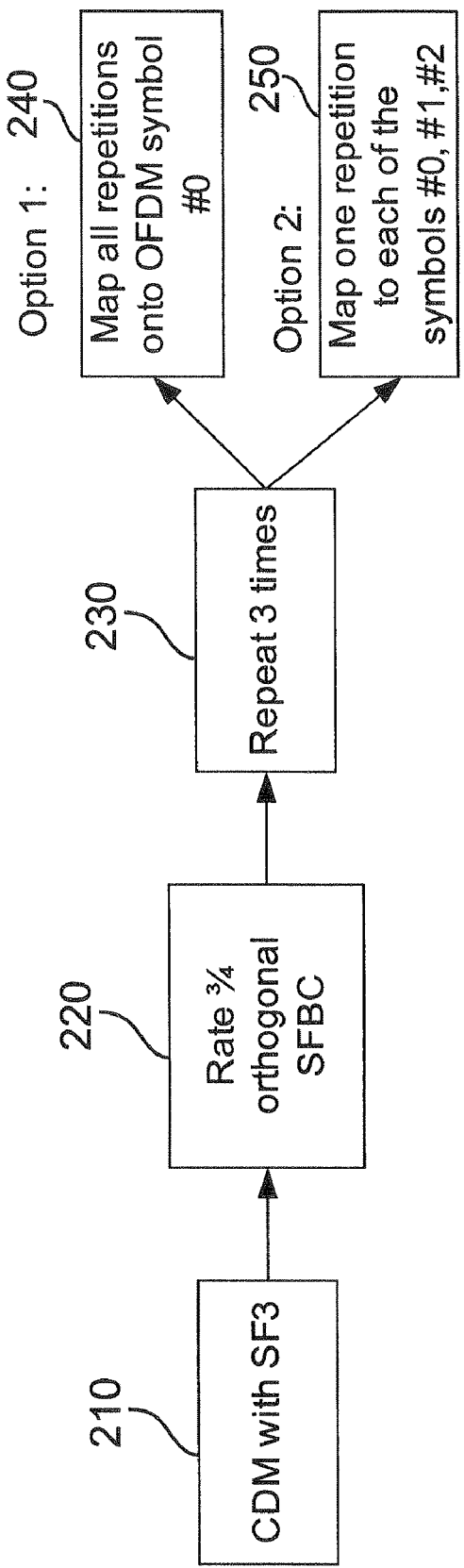
FIG. 12 schematically illustrates procedures for multiplexing and encoding downlink acknowledgement bits according to one embodiment of the principles of the present invention.

In a fourth embodiment according to the principles of the present invention, we propose to use a different CDM method and transmit diversity scheme for the ACK/NACK bits in the downlink. As illustrated in FIG. 12, at first, a CDM scheme of SF length 3 is used to multiplex the ACK bits to be transmitted (step 210). Then, a spatial rate ¾ orthogonal SFBC code (that is different from any of the SFBC code discussed above) is applied to the CDMed symbol (step 220). The ¾ orthogonal SFBC code is output by three repetitions (step 230). Afterwards, the three repetitions are mapped either to the first OFDM symbol #0 (step 240), or to the three OFDM symbols respectively, in a way such that each OFDM will contain one repetition (step 250). In either case, the PA balance is always achieved in this proposed scheme for each repetition. In addition, for each repetition, the full $4^{th}$ order diversity is obtained.

The SF3 CDM without I/Q multiplexing is described as follows. Let $b=[b_1, \ldots, b_3]$ be the three ACK bits that are BPSK-modulated, let $S=[s_1, \ldots, s_3]$ be the unitary spreading matrix where each spreading vector $s_1, \ldots, s_3$ is of size 1×3, then the transmit signal $a=[a_1, \ldots, a_3]$ after CDM spreading is given by:

$$a = SWb = [s_1, \ldots, s_3] \begin{bmatrix} w_1 b_1 \\ \vdots \\ w_3 b_3 \end{bmatrix} \quad (10)$$

where $W=\text{diag}[w_1, \ldots, w_3]$ is a diagonal matrix indicating the transmission amplitude of the ACK bits. One example of the set of SF3 spreading codes is $s_1=[1,1,1]^T$, $s_2=[1, e^{j2\pi/3}, e^{j4\pi/3}]^T$, $s_2=[1, e^{j4\pi/3}, e^{j8\pi/3}]^T$.

Furthermore, multiplexing capacity can be doubled if we use both I and Q (real and imaginary) branches to carry different ACK bits with different power setting. To this end, let $b_i=[b_{1,i}, \ldots, b_{3,i}]$ be the three BPSK-modulated ACK bits to be carried on the i-branch (real branch) and let $b_q=[b_{1,q}, \ldots, b_{3,q}]$ be the three BPSK-modulated ACK bits to be carried on the q-branch (imaginary branch), let $S=[s_1, \ldots, s_3]$ be the unitary spreading matrix where each spreading vector $s_1, \ldots, s_3$ is of size 1×3, then the transmit signal $a=[a_1, \ldots, a_3]$ after CDM spreading is given by:

$$a = S(W_i b_i + jW_q b_q) = [s_1, \ldots, s_3] \begin{bmatrix} w_{1,i} b_{1,i} + jw_{1,q} b_{1,q} \\ \vdots \\ w_{3,i} b_{3,i} + jw_{3,q} b_{3,q} \end{bmatrix} \quad (11)$$

where $W_i=\text{diag}[w_{1,i}, \ldots, w_{3,i}]$ and $W_q=\text{diag}[w_{1,q}, \ldots, w_{3,q}]$ are two diagonal matrices indicating the transmission amplitudes of the ACK bits on I and Q branches, respectively.

One example of the rate ¾ Orthogonal Space-Frequency Block Code (OSFBC) is given by matrix C:

$$C = \begin{bmatrix} a_1 & 0 & a_2 & -a_3 \\ 0 & a_1 & a_3^* & a_2^* \\ -a_2^* & -a_3 & a_1^* & 0 \\ a_3^* & -a_2 & 0 & a_1^* \end{bmatrix} \quad (12)$$

The equivalent precoding representation for the matrix C is given by:

$$C: \begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 1 & 0 & 0 & 0 & -j & 0 \\ 0 & 0 & 0 & 0 & 0 & 0 & 0 & 0 \\ 1 & 0 & 0 & 0 & j & 0 & 0 & 0 \\ 0 & 0 & -1 & 0 & 0 & 0 & -j & 0 \\ 0 & -1 & 0 & 0 & 0 & -j & 0 & 0 \\ 0 & 1 & 0 & 0 & 0 & j & 0 & 0 \\ 0 & 0 & 1 & 0 & 0 & 0 & -j & 0 \\ 1 & 0 & 0 & 0 & -j & 0 & 0 & 0 \\ 0 & 0 & 0 & 0 & 0 & 0 & 0 & 0 \\ 0 & 0 & -1 & 0 & 0 & 0 & -j & 0 \\ 0 & 1 & 0 & 0 & 0 & -j & 0 & j \\ 0 & 0 & 0 & 0 & 0 & 0 & 0 & 0 \\ 1 & 0 & 0 & 0 & -j & 0 & 0 & 0 \end{bmatrix} \begin{bmatrix} \operatorname{Re}(a_1) \\ \operatorname{Re}(a_2) \\ \operatorname{Re}(a_3) \\ \operatorname{Re}(a_4) \\ \operatorname{Im}(a_1) \\ \operatorname{Im}(a_2) \\ \operatorname{Im}(a_3) \\ \operatorname{Im}(a_4) \end{bmatrix} \quad (13)$$

Note that in the above equation, $a_4$ is not presented in the CDMed symbol a. Therefore, the matrix C may be given by:

$$C: \begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 1 & 0 & 0 & 0 & -j & 0 \\ 0 & 0 & 0 & 0 & 0 & 0 & 0 & 0 \\ 0 & 0 & 0 & 0 & j & 0 & 0 & 0 \\ 0 & 0 & -1 & 0 & 0 & 0 & j & 0 \\ 0 & -1 & 0 & 0 & 0 & -j & 0 & 0 \\ 0 & 1 & 0 & 0 & 0 & j & 0 & 0 \\ 0 & 0 & 1 & 0 & 0 & 0 & -j & 0 \\ 1 & 0 & 0 & 0 & -j & 0 & 0 & 0 \\ 0 & 0 & 0 & 0 & 0 & 0 & 0 & 0 \\ 0 & 0 & -1 & 0 & 0 & 0 & -j & 0 \\ 0 & 1 & 0 & 0 & 0 & -j & 0 & j \\ 0 & 0 & 0 & 0 & 0 & 0 & 0 & 0 \\ 1 & 0 & 0 & 0 & -j & 0 & 0 & 0 \end{bmatrix} \begin{bmatrix} \operatorname{Re}(a_1) \\ \operatorname{Re}(a_2) \\ \operatorname{Re}(a_3) \\ 0 \\ \operatorname{Im}(a_1) \\ \operatorname{Im}(a_2) \\ \operatorname{Im}(a_3) \\ 0 \end{bmatrix} \quad (14)$$

Figure 13:
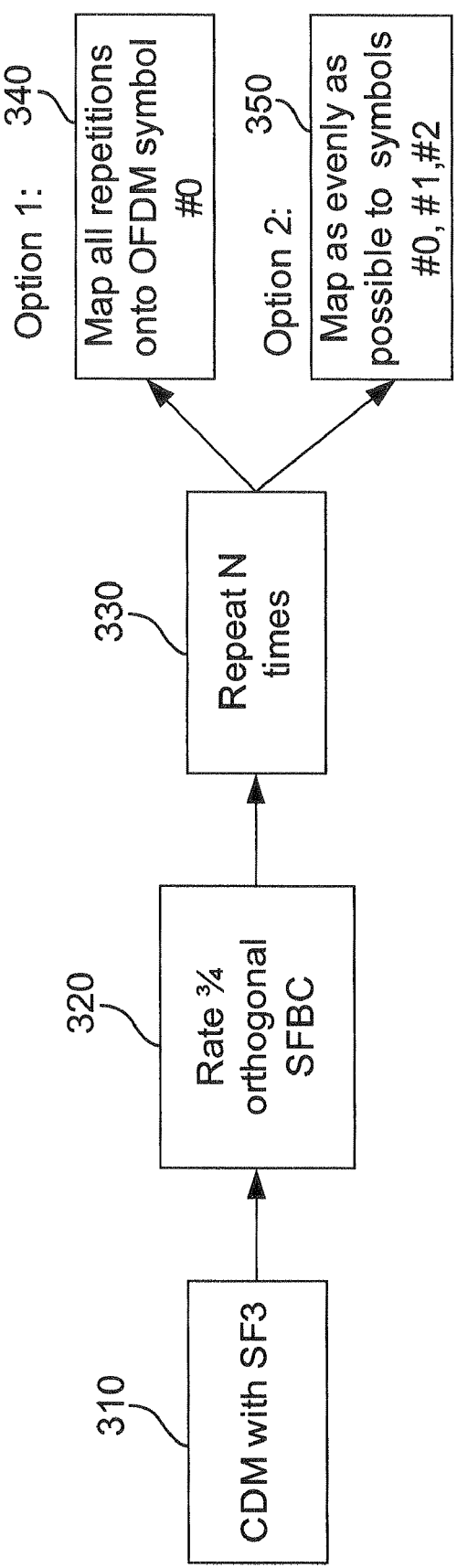
FIG. 13 schematically illustrates procedures for multiplexing and encoding downlink acknowledgement bits according to another embodiment of the principles of the present invention.

In a fifth embodiment according to the principles of the present invention as illustrated in FIG. 13, we again propose to use CDM with SF length 3 to multiplex the ACK bits (step 310), followed by a spatial rate ¾ Orthogonal Space-Frequency Block Code (OSFBC) code (step 320). An arbitrary number of N repetitions, however, is allowed at the output of the ¾ orthogonal SFBC code (step 330). Afterwards, the N repetitions are mapped either to the first OFDM symbol #0 (step 340), or to the three OFDM symbols in a way such that each OFDM will contain roughly equal amount of repetitions (step 350). For example, let n=1, . . . , N be the index of the repetitions, then the index, k(n), of the OFDM symbol mapped to the n-th repetition may be:

$$k(n) = \begin{cases} 0 & \text{if } n \leq \lceil N/3 \rceil \\ 1 & \text{if } n \leq 2 \cdot \lceil N/3 \rceil \\ 2 & \text{if } n > 2 \cdot \lceil N/3 \rceil \end{cases} \quad (15)$$

Alternatively, the index, k(n), of the OFDM symbol mapped to the n-th repetition may be:

$$k(n) = \operatorname{mod}(N-1, 3). \quad (16)$$

While the present invention has been shown and described in connection with the preferred embodiments, it will be apparent to those skilled in the art that modifications and variations can be made without departing from the spirit and scope of the invention as defined by the appended claims.

What is claimed is:

1. A method for transmitting data, the method comprising the steps of:

multiplexing a plurality of information bits to be transmitted by using one of a first code division multiplexing scheme and a second code division multiplexing scheme combined with a real and imaginary multiplexing scheme, to generate a code division multiplexed symbol a comprising four vectors $a=[a_1, \ldots, a_4]$; and repeatedly transmitting the code division multiplexed symbol a by alternatively applying two transmit diversity schemes via four transmission antennas, with:

in a first transmit diversity scheme, a transmit signal being established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} a_1 & a_2 & a_3 & a_4 \\ 0 & 0 & 0 & 0 \\ -a_2^* & a_1^* & -a_4^* & a_3^* \\ 0 & 0 & 0 & 0 \end{bmatrix},$$

where $T_{ij}$ represents the symbol transmitted on the i-th antenna and the j-th subcarrier, and i=1, 2, 3, 4, j=1, 2, 3, 4; and in a second transmit diversity scheme, a transmit signal being established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} 0 & 0 & 0 & 0 \\ a_1 & a_2 & a_3 & a_4 \\ 0 & 0 & 0 & 0 \\ -a_2^* & a_1^* & -a_4^* & a_3^* \end{bmatrix}$$

where $T_{ij}$ represents the symbol transmitted on the i-th antenna and the j-th subcarrier, and i=1, 2, 3, 4, j=1, 2, 3, 4.

2. The method of claim 1, comprised of, in accordance with the first code division multiplexing scheme, the code division multiplexed symbol a being established by:

$$a = SWb = [s_1, \ldots, s_4] \begin{bmatrix} w_1 b_1 \\ \vdots \\ w_4 b_4 \end{bmatrix}$$

where $b=[b_1, \ldots, b_4]$ indicates the four information bits, $S=[s_1, \ldots, s_4]$ indicates a unitary spreading matrix where each spreading vector $s_1, \ldots, s_4$ is of size 1×4, $W=\text{diag}[w_1, \ldots, w_4]$ is a diagonal matrix indicating transmission amplitudes of the information bits.

3. The method of claim 1, comprised of, in accordance with the second code division multiplexing scheme combined with the real and imaginary multiplexing scheme, the code division multiplexed symbol a being established by:

$$a = S(W_i b_i + jW_q b_q) = [s_1, \ldots, s_4] \begin{bmatrix} w_{1,i} b_{1,i} + j w_{1,q} b_{1,q} \\ \vdots \\ w_{4,i} b_{4,i} + j w_{4,q} b_{4,q} \end{bmatrix}$$

where $b_i=[b_{1,i}, \ldots, b_{4,i}]$ indicates the four information bits to be carried on a real branch, $b_q=[b_{1,q}, \ldots, b_{4,q}]$ indicates the four information bits to be carried on an imaginary branch, $S=[s_1, \ldots, s_4]$ indicates a unitary spreading matrix where each spreading vector $s_1, \ldots, s_4$ is of size 1×4, and $W_i=\text{diag}[w_{1,i}, \ldots, w_{4,i}]$ and $W_q=\text{diag}[w_{1,q}, \ldots, w_{4,q}]$ are two diagonal matrices indicating transmission amplitudes of the information bits on the real and imaginary branches, respectively.

4. The method of claim 1, comprised of applying the first transmit diversity scheme on even-numbered repetitions, and applying the second transmit diversity scheme on odd-numbered repetitions.

5. The method of claim 4, comprised of:
the transmit signal according to the first transmit diversity being established by:

$$A: \begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 1 & 0 & 0 & 0 & 0 & 0 \\ 0 & 1 & 0 & 0 & 0 & j & 0 & 0 \\ 0 & 0 & 0 & 0 & -j & 0 & 0 & 0 \\ 1 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \\ 0 & 0 & 0 & 0 & 0 & 0 & 0 & 0 \end{bmatrix} \begin{bmatrix} \text{Re}(a_1) \\ \text{Re}(a_2) \\ \text{Re}(a_3) \\ \text{Re}(a_4) \\ \text{Im}(a_1) \\ \text{Im}(a_2) \\ \text{Im}(a_3) \\ \text{Im}(a_4) \end{bmatrix},$$

where $y(i)=[y^{(0)}(i)\ y^{(1)}(i)\ y^{(2)}(i)\ y^{(3)}(i)]^T$ indicates the transmit signal vector on four transmission antennas for the i-th subcarrier; and
the transmit signal according to the first transmit diversity being established by:

$$B: \begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 0 & 0 & 0 & 0 & 0 & 0 & 0 & 0 \\ 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & -j & 0 & 0 & 0 \\ 1 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & 0 & 0 \\ 0 & 0 & 0 & 0 & 0 & 0 & j & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \text{Re}(a_1) \\ \text{Re}(a_2) \\ \text{Re}(a_3) \\ \text{Re}(a_4) \\ \text{Im}(a_1) \\ \text{Im}(a_2) \\ \text{Im}(a_3) \\ \text{Im}(a_4) \end{bmatrix},$$

where $y(i)=[y^{(0)}(i)\ y^{(1)}(i)\ y^{(2)}(i)\ y^{(3)}(i)]^T$ indicates the transmit signal vector on four transmission antennas for the i-th subcarrier.

6. The method of claim 1, comprised of applying the first transmit diversity scheme on odd-numbered repetitions, and applying the second transmit diversity scheme on even-numbered repetitions.

7. The method of claim 6, comprised of:
the transmit signal according to the first transmit diversity being established by:

$$A: \begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 1 & 0 & 0 & 0 & 0 & 0 \\ 0 & 1 & 0 & 0 & 0 & j & 0 & 0 \\ 0 & 0 & 0 & 0 & -j & 0 & 0 & 0 \\ 1 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \\ 0 & 0 & 0 & 0 & 0 & 0 & 0 & 0 \end{bmatrix} \begin{bmatrix} \text{Re}(a_1) \\ \text{Re}(a_2) \\ \text{Re}(a_3) \\ \text{Re}(a_4) \\ \text{Im}(a_1) \\ \text{Im}(a_2) \\ \text{Im}(a_3) \\ \text{Im}(a_4) \end{bmatrix},$$

where $y(i)=[y^{(0)}(i)\ y^{(1)}(i)\ y^{(2)}(i)\ y^{(3)}(i)]^T$ indicates the transmit signal vector on four transmission antennas for the i-th subcarrier, and the transmit signal according to the first transmit diversity being established by:

$$B: \begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 0 & 0 & 0 & 0 & 0 & 0 & 0 & 0 \\ 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & -j & 0 & 0 & 0 \\ 1 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & 0 & 0 \\ 0 & 0 & 0 & 0 & 0 & 0 & j & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \mathrm{Re}(a_1) \\ \mathrm{Re}(a_2) \\ \mathrm{Re}(a_3) \\ \mathrm{Re}(a_4) \\ \mathrm{Im}(a_1) \\ \mathrm{Im}(a_2) \\ \mathrm{Im}(a_3) \\ \mathrm{Im}(a_4) \end{bmatrix},$$

where $y(i)=[y^{(0)}(i)\ y^{(1)}(i)\ y^{(2)}(i)\ y^{(3)}(i)]^T$ indicates the transmit signal vector on four transmission antennas for the i-th subcarrier.

8. The method of claim 1, comprised of:
transmitting the code division multiplexed symbol a via at least one time unit among a plurality of time units within a subframe;
when the code division multiplexed symbol a is transmitted via more than one time unit, and when the number of repetitions is even, transmitting the same number of repetitions in the more than one time unit by alternatively applying the two transmit diversity schemes in each time unit.

9. A method for transmitting data, the method comprising the steps of:
multiplexing a plurality of bits to be transmitted by using one of a first code division multiplexing scheme and a second code division multiplexing scheme combined with a real and imaginary multiplexing scheme, to generate a code division multiplexed symbol a comprising four vectors $a=[a_1, \ldots, a_4]$; and
repeatedly transmitting the code division multiplexed symbol a by alternatively applying two transmit diversity schemes via four transmission antennas, with:
in a first transmit diversity scheme, a transmit signal being established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} a_1 & a_2 & 0 & 0 \\ 0 & 0 & a_3 & a_4 \\ -a_2^* & a_1^* & 0 & 0 \\ 0 & 0 & -a_4^* & a_3^* \end{bmatrix},$$

where $T_{ij}$ represents the symbol transmitted on the i-th antenna and the j-th subcarrier, and i=1, 2, 3, 4, j=1, 2, 3, 4; and
in a second transmit diversity scheme, a transmit signal being established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} 0 & 0 & a_3 & a_4 \\ a_1 & a_2 & 0 & 0 \\ 0 & 0 & -a_4^* & a_3^* \\ -a_2^* & a_1^* & 0 & 0 \end{bmatrix}$$

where $T_{ij}$ represents the symbol transmitted on the i-th antenna and the j-th subcarrier, and i=1, 2, 3, 4, j=1, 2, 3, 4.

10. The method of claim 9, comprised of, in accordance with the first code division multiplexing scheme, the code division multiplexed symbol a being established by:

$$a = SWb = [s_1, \ldots, s_4] \begin{bmatrix} w_1 b_1 \\ \vdots \\ w_4 b_4 \end{bmatrix}$$

where $b=[b_1, \ldots, b_4]$ indicates the four information bits, $S=[s_1, \ldots, s_4]$ indicates a unitary spreading matrix where each spreading vector $s_1, \ldots, s_4$ is of size 1×4, $W=\mathrm{diag}[w_1, \ldots, w_4]$ is a diagonal matrix indicating transmission amplitudes of the information bits.

11. The method of claim 9, comprised of, in accordance with the second code division multiplexing scheme combined with the real and imaginary multiplexing scheme, the code division multiplexed symbol a being established by:

$$a = S(W_i b_i + jW_q b_q) = [s_1, \ldots, s_4] \begin{bmatrix} w_{1,i} b_{1,i} + jw_{1,q} b_{1,q} \\ \vdots \\ w_{4,i} b_{4,i} + jw_{4,q} b_{4,q} \end{bmatrix}$$

where $b_i=[b_{1,i}, \ldots, b_{4,i}]$ indicates the four information bits to be carried on a real branch, $b_q=[b_{1,q}, \ldots, b_{4,q}]$ indicates the four information bits to be carried on an imaginary branch, $S=[s_1, \ldots, s_4]$ indicates a unitary spreading matrix where each spreading vectors $s_1, \ldots, s_4$ is of size 1×4, and $W_i=\mathrm{diag}[w_{1,i}, \ldots, w_{4,i}]$ and $W_q=\mathrm{diag}[w_{1,q}, \ldots, w_{4,q}]$ are two diagonal matrices indicating transmission amplitudes of the information bits on the real and imaginary branches, respectively.

12. The method of claim 9, comprised of applying the first transmit diversity scheme on even-numbered repetitions, and applying the second transmit diversity scheme on odd-numbered repetitions.

13. The method of claim 9, comprised of applying the first transmit diversity scheme on odd-numbered repetitions, and applying the second transmit diversity scheme on even-numbered repetitions.

14. The method of claim 9, comprised of:
transmitting the code division multiplexed symbol a via at least one time unit among a plurality of time units within a subframe;
when the code division multiplexed symbol a is transmitted via more than one time unit, and when the number of repetitions is even, transmitting the same number of repetitions in the more than one time unit by alternatively applying the two transmit diversity schemes in each time unit.

15. A method for transmitting data, the method comprising the steps of:
multiplexing a plurality of information bits to be transmitted by using one of a first code division multiplexing scheme and a second code division multiplexing scheme combined with a real and imaginary multiplexing scheme, to generate a code division multiplexed symbol a comprising three vectors a=[a$_1$, . . . , a$_3$]; and repeatedly transmitting the code division multiplexed symbol a by applying a transmit diversity scheme via four transmission antennas, with the transmit signal being established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} a_1 & 0 & a_2 & -a_3 \\ 0 & a_1 & a_3^* & a_2^* \\ -a_2^* & -a_3 & a_1^* & 0 \\ a_3^* & -a_2 & 0 & a_1^* \end{bmatrix},$$

where $T_{ij}$ represents the symbol transmitted on the i-th antenna and the j-th subcarrier, and i=1, 2, 3, 4, j=1, 2, 3, 4.

16. The method of claim 15, comprised of, in accordance with the first code division multiplexing scheme, the code division multiplexed symbol a being established by:

$$a = SWb = [s_1, \ldots, s_3] \begin{bmatrix} w_1 b_1 \\ \vdots \\ w_3 b_3 \end{bmatrix}$$

where b=[b$_1$, . . . , b$_3$] indicates the four information bits, S=[s$_1$, . . . , s$_3$] indicates a unitary spreading matrix where each spreading vector s$_1$, . . . , s$_3$ is of size 1×3, W=diag[w$_1$, . . . , w$_3$] is a diagonal matrix indicating transmission amplitudes of the information bits.

17. The method of claim 15, comprised of, in accordance with the second code division multiplexing scheme combined with the real and imaginary multiplexing scheme, the code division multiplexed symbol a being established by:

$$a = S(W_i b_i + j W_q b_q) = [s_1, \ldots, s_3] \begin{bmatrix} w_{1,i} b_{1,i} + j w_{1,q} b_{1,q} \\ \vdots \\ w_{3,i} b_{3,i} + j w_{3,q} b_{3,q} \end{bmatrix}$$

where b$_i$=[b$_{1,i}$, . . . , b$_{3,i}$] indicates the four information bits to be carried on a real branch, b$_q$=[b$_{1,q}$, . . . , b$_{3,q}$] indicates the four information bits to be carried on an imaginary branch, S=[s$_1$, . . . , s$_3$] indicates a unitary spreading matrix where each spreading vector s$_1$, . . . , s$_3$ is of size 1×3, and W$_i$=diag[w$_{1,i}$, . . . , w$_{3,i}$] and W$_q$=diag[w$_{1,q}$, . . . , w$_{3,q}$] are two diagonal matrices indicating transmission amplitudes of the information bits on the real and imaginary branches, respectively.

18. The method of claim 15, comprised of transmitting the code division multiplexed symbol a for three repetitions in a time unit among a plurality of time units within a subframe.

19. The method of claim 15, comprised of transmitting the code division multiplexed symbol a for three repetitions in three time units among a plurality of time units within a subframe, with each repetition corresponding to one time unit.

20. The method of claim 15, comprised of transmitting the code division multiplexed symbol a for a plurality of repetitions in a time unit among a plurality of time units within a subframe.

21. The method of claim 15, comprised of transmitting the code division multiplexed symbol a for a plurality of repetitions in three time units among a plurality of time units within a subframe, by assigning roughly equal number of repetitions to each one of the three time units.

22. The method of claim 21, comprised of an index, k(n), of the time unit assigned to an n-th repetition being established by:

$$k(n) = \begin{cases} 0 & \text{if } n \leq \lceil N/3 \rceil \\ 1 & \text{if } n \leq 2 \cdot \lceil N/3 \rceil, \\ 2 & \text{if } n > 2 \cdot \lceil N/3 \rceil \end{cases}$$

where N is the total number of the repetitions.

23. The method of claim 21, comprised of an index, k(n), of the time unit assigned to an n-th repetition being established by:

$$k(n) = \text{mod}(N-1, 3),$$

where N is the total number of the repetitions.

24. A wireless terminal in a communication system, comprising:

a multiplexing unit multiplexing a plurality of information bits to be transmitted by using one of a first code division multiplexing scheme and a second code division multiplexing scheme combined with a real and imaginary multiplexing scheme, to generate a code division multiplexed symbol a comprising four vectors a=[a$_1$, . . . , a$_4$];

a transmission processing unit processing the code division multiplexed symbol a by applying two transmit diversity schemes to generate two transmit signals, with:

a first transmit signal generated in accordance with a first transmit diversity scheme being established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} a_1 & a_2 & a_3 & a_4 \\ 0 & 0 & 0 & 0 \\ -a_2^* & a_1^* & -a_4^* & a_3^* \\ 0 & 0 & 0 & 0 \end{bmatrix},$$

where $T_{ij}$ represents the symbol transmitted on the i-th antenna and the j-th subcarrier, and i=1, 2, 3, 4, j=1, 2, 3, 4; and a second transmit signal generated in accordance with a second transmit diversity scheme being established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} 0 & 0 & 0 & 0 \\ a_1 & a_2 & a_3 & a_4 \\ 0 & 0 & 0 & 0 \\ -a_2^* & a_1^* & -a_4^* & a_3^* \end{bmatrix}$$

where $T_{ij}$ represents the symbol transmitted on the i-th antenna and the j-th subcarrier, and i=1, 2, 3, 4, j=1, 2, 3, 4; and four transmission antennas alternatively transmitting the first transmit signal and the second transmit signal for a plurality of repetitions.

25. The wireless terminal of claim 24, comprised of, in accordance with the first code division multiplexing scheme, the code division multiplexed symbol a being established by:

$$a = SWb = [s_1, \ldots, s_4] \begin{bmatrix} w_1 b_1 \\ \vdots \\ w_4 b_4 \end{bmatrix}$$

where $b=[b_1, \ldots, b_4]$ indicates the four information bits, $S=[s_1, \ldots, s_4]$ indicates a unitary spreading matrix where each spreading vector $s_1, \ldots, s_4$ is of size 1×4, $W=\text{diag}[w_1, \ldots, w_4]$ is a diagonal matrix indicating transmission amplitudes of the information bits.

26. The wireless terminal of claim 24, comprised of, in accordance with the second code division multiplexing scheme combined with the real and imaginary multiplexing scheme, the code division multiplexed symbol a being established by:

$$a = S(W_i b_i + j W_q b_q) = [s_1, \ldots, s_4] \begin{bmatrix} w_{1,i} b_{1,i} + j w_{1,q} b_{1,q} \\ \vdots \\ w_{4,i} b_{4,i} + j w_{4,q} b_{4,q} \end{bmatrix}$$

where $b=[b_{1,i}, \ldots, b_{4,i}]$ indicates the four information bits to be carried on a real branch, $b_q=[b_{1,q}, \ldots, b_{4,q}]$ indicates the four information bits to be carried on an imaginary branch, $S=[s_1, \ldots, s_4]$ indicates a unitary spreading matrix where each spreading vector $s_1, \ldots, s_4$ is of size 1×4, and $W_i=\text{diag}[w_{1,i}, \ldots, w_{4,i}]$ and $W_q=\text{diag}[w_{1,q}, \ldots, w_{4,q}]$ are two diagonal matrices indicating transmission amplitudes of the information bits on the real and imaginary branches, respectively.

27. The wireless terminal of claim 24, comprised of the four transmission antennas transmitting the first transmit signal on even-numbered repetitions, and transmitting the second transmit signal on odd-numbered repetitions.

28. The wireless terminal of claim 24, comprised of the four transmission antennas transmitting the first transmit signal on odd-numbered repetitions, and transmitting the second transmit signal on even-numbered repetitions.

29. The wireless terminal of claim 24, comprised of:
transmitting the code division multiplexed symbol a via at least one time unit among a plurality of time units within a subframe;
when the code division multiplexed symbol a is transmitted via more than one time unit, and when the number of repetitions is even, transmitting the same number of repetitions in the more than one time unit by alternatively applying the two transmit diversity schemes in each time unit.

30. A wireless terminal in a communication system, comprising:
a multiplexing unit multiplexing a plurality of information bits to be transmitted by using one of a first code division multiplexing scheme and a second code division multiplexing scheme combined with a real and imaginary multiplexing scheme, to generate a code division multiplexed symbol a comprising four vectors $a=[a_1, \ldots, a_4]$;
a transmission processing unit processing the code division multiplexed symbol a by applying two transmit diversity schemes to generate two transmit signals, with:
a first transmit signal generated in accordance with a first transmit diversity scheme being established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} a_1 & a_2 & 0 & 0 \\ 0 & 0 & a_3 & a_4 \\ -a_2^* & a_1^* & 0 & 0 \\ 0 & 0 & -a_4^* & a_3^* \end{bmatrix},$$

where $T_{ij}$ represents the symbol transmitted on the i-th antenna and the j-th subcarrier, and i=1, 2, 3, 4, j=1, 2, 3, 4; and
a second transmit signal generated in accordance with a second transmit diversity scheme being established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} 0 & 0 & a_3 & a_4 \\ a_1 & a_2 & 0 & 0 \\ 0 & 0 & -a_4^* & a_3^* \\ -a_2^* & a_1^* & 0 & 0 \end{bmatrix}$$

where $T_{ij}$ represents the symbol transmitted on the i-th antenna and the j-th subcarrier, and i=1, 2, 3, 4, j=1, 2, 3, 4; and
four transmission antennas alternatively transmitting the first transmit signal and the second transmit signal for a plurality of repetitions.

31. The wireless terminal of claim 30, comprised of, in accordance with the first code division multiplexing scheme, the code division multiplexed symbol a being established by:

$$a = SWb = [s_1, \ldots, s_4] \begin{bmatrix} w_1 b_1 \\ \vdots \\ w_4 b_4 \end{bmatrix}$$

where $b=[b_1, \ldots, b_4]$ indicates the four information bits, $S=[s_1, \ldots, s_4]$ indicates a unitary spreading matrix where each spreading vector $S_1, \ldots, s_4$ is of size 1×4, $W=\text{diag}[w_1, \ldots, w_4]$ is a diagonal matrix indicating transmission amplitudes of the information bits.

32. The wireless terminal of claim 30, comprised of, in accordance with the second code division multiplexing scheme combined with the real and imaginary multiplexing scheme, the code division multiplexed symbol a being established by:

$$a = S(W_i b_i + j W_q b_q) = [s_1, \ldots, s_4] \begin{bmatrix} w_{1,i} b_{1,i} + j w_{1,q} b_{1,q} \\ \vdots \\ w_{4,i} b_{4,i} + j w_{4,q} b_{4,q} \end{bmatrix}$$

where $b_1=[b_{1,i}, \ldots, b_{4,i}]$ indicates the four information bits to be carried on a real branch, $b_q=[b_{1,q}, \ldots, b_{4,q}]$ indicates the four information bits to be carried on an imaginary branch, $S=[s_1, \ldots, s_4]$ indicates a unitary spreading matrix where each spreading vector $s_1, \ldots, s_4$ is of size 1×4, and $W_i=\text{diag}[w_{1,i}, \ldots, w_{4,i}]$ and $W_q=\text{diag}[w_{1,q}, \ldots, w_{4,q}]$ are two diagonal matrices indicating transmission amplitudes of the information bits on the real and imaginary branches, respectively.

33. The wireless terminal of claim 30, comprised of the four transmission antennas transmitting the first transmit signal on even-numbered repetitions, and transmitting the second transmit signal on odd-numbered repetitions.

34. The wireless terminal of claim 30, comprised of the four transmission antennas transmitting the first transmit signal on odd-numbered repetitions, and transmitting the second transmit signal on even-numbered repetitions.

35. The wireless terminal of claim 30, comprised of:
transmitting the code division multiplexed symbol a via at least one time unit among a plurality of time units within a subframe;
when the code division multiplexed symbol a is transmitted via more than one time unit, and when the number of repetitions is even, transmitting the same number of repetitions in the more than one time unit by alternatively applying the two transmit diversity schemes in each time unit.

36. A wireless terminal in a communication system, comprising:
a multiplexing unit multiplexing a plurality of information bits to be transmitted by using one of a first code division multiplexing scheme and a second code division multiplexing scheme combined with a real and imaginary multiplexing scheme, to generate a code division multiplexed symbol a comprising three vectors $a=[a_1, \ldots, a_3]$; and
a transmission processing unit processing the code division multiplexed symbol a by applying a transmit diversity scheme to generate a transmit signal established by:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} a_1 & 0 & a_2 & -a_3 \\ 0 & a_1 & a_3^* & a_2^* \\ -a_2^* & -a_3 & a_1^* & 0 \\ a_3^* & -a_2 & 0 & a_1^* \end{bmatrix},$$

where $T_{ij}$ represents the symbol transmitted on the i-th antenna and the j-th subcarrier, and i=1, 2, 3, 4, j=1, 2, 3, 4; and
four transmission antennas transmitting the transmit signal for a plurality of repetitions.

37. The wireless terminal of claim 36, comprised of, in accordance with the first code division multiplexing scheme, the code division multiplexed symbol a being established by:

$$a = SWb = [s_1, \ldots, s_3] \begin{bmatrix} w_1 b_1 \\ \vdots \\ w_3 b_3 \end{bmatrix}$$

where $b=[b_1, \ldots, b_3]$ indicates the four information bits, $S=[s_1, \ldots, s_3]$ indicates a unitary spreading matrix where each spreading vector $s_1, \ldots s_3$ is of size 1×3, $W=\mathrm{diag}[w_1, \ldots, w_3]$ is a diagonal matrix indicating transmission amplitudes of the information bits.

38. The wireless terminal of claim 36, comprised of, in accordance with the second code division multiplexing scheme combined with the real and imaginary multiplexing scheme, the code division multiplexed symbol a being established by:

$$a = S(W_i b_i + jW_q b_q) = [s_1, \ldots, s_3] \begin{bmatrix} w_{1,i} b_{1,i} + jw_{1,q} b_{1,q} \\ \vdots \\ w_{3,i} b_{3,i} + jw_{3,q} b_{3,q} \end{bmatrix}$$

where $b_i=[b_{1,i}, \ldots, b_{3,i}]$ indicates the four information bits to be carried on a real branch, $b_q=[b_{1,q}, \ldots, b_{3,q}]$ indicates the four information bits to be carried on an imaginary branch, $S=[s_1, \ldots, s_3]$ indicates a unitary spreading matrix where each spreading vector $s_1, \ldots, s_3$ is of size 1×3, and $W_i=\mathrm{diag}[w_{1,i}, \ldots, w_{3,i}]$ and $W_q=\mathrm{diag}[w_{1,q}, \ldots, w_{3,q}]$ are two diagonal matrices indicating transmission amplitudes of the information bits on the real and imaginary branches, respectively.

39. The wireless terminal of claim 36, comprised of the four transmission antennas transmitting the code division multiplexed symbol a for three repetitions in a time unit among a plurality of time units within a subframe.

40. The wireless terminal of claim 36, comprised of the four transmission antennas transmitting the code division multiplexed symbol a for three repetitions in three time units among a plurality of time units within a subframe, with each repetition corresponding to one time unit.

41. The wireless terminal of claim 36, comprised of the four transmission antennas transmitting the code division multiplexed symbol a for a plurality of repetitions in a time unit among a plurality of time units within a subframe.

42. The wireless terminal of claim 36, comprised of the four transmission antennas transmitting the code division multiplexed symbol a for a plurality of repetitions in three time units among a plurality of time units within a subframe, by assigning roughly equal number of repetitions to each one of the three time units.

43. The wireless terminal of claim 42, comprised of an index, k(n), of the time unit assigned to an n-th repetition being established by:

$$k(n) = \begin{cases} 0 & \text{if } n \le \lceil N/3 \rceil \\ 1 & \text{if } n \le 2\cdot \lceil N/3 \rceil, \\ 2 & \text{if } n > 2\cdot \lceil N/3 \rceil \end{cases}$$

where N is the total number of the repetitions.

44. The wireless terminal of claim 42, comprised of an index, k(n), of the time unit assigned to an n-th repetition being established by:

$k(n) = \mathrm{mod}(N-1, 3),$ where N is the total number of the repetitions.

* * * * *